ness AVAILABLE COPY

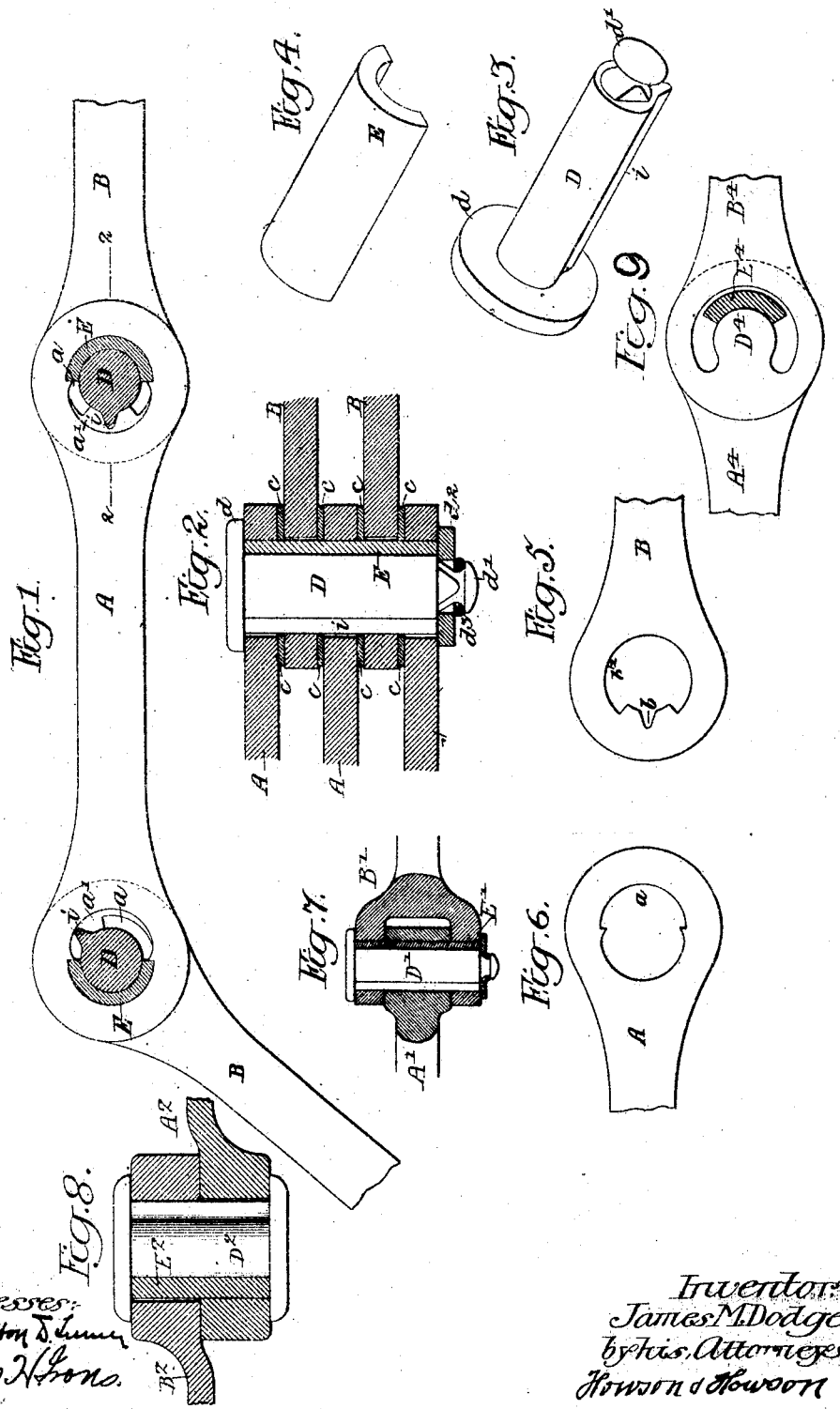

UNITED STATES PATENT OFFICE.

JAMES M. DODGE, OF PHILADELPHIA, PENNSYLVANIA.

CHAIN.

No. 901,789.

Specification of Letters Patent.

Patented Oct. 20, 1908.

Application filed March 31, 1904. Serial No. 201,001.

*To all whom it may concern:*

Be it known that I, JAMES M. DODGE, a citizen of the United States, residing in Philadelphia, Pennsylvania, have invented certain Improvements in Chains, of which the following is a specification.

My invention relates to certain improvements in chains of the type broadly claimed in an application for patent filed by me on the 17th day of March 1904, Serial No. 198,655, in which extended bearings are provided for the links or elements of the chain.

The object of my present invention is to improve the construction of that type of chain in which the pivot pin is carried by one link and a bearing or bushing is carried by another link to which the first link is connected, whereby an extended bearing is provided; and to prevent the rapid wearing away of the pivot pins and link elements of chains in which the links are composed of a series of flat link elements.

In the accompanying drawings:—Figure 1. is a longitudinal sectional view of a chain illustrating my invention: Fig. 2. is a section on the line 2—2, Fig. 1: Fig. 3. is a detached perspective view of the pivot pin: Fig. 4. is a detached perspective view of the bushing; Figs. 5 and 6, are side views of portions of the links; and Figs. 7, 8 and 9, are views of modifications of my invention.

Referring to Figs. 1 to 6 inclusive, the chain is made up of two sets of flat links or elements A and B, these links are, in the present instance, arranged in series, being flat, as shown in Fig. 2. In the present instance the links are separated by washers $c$ although in some instances the washers may be dispensed with.

D is the pivot pin by which the links are coupled together, the pivot pin has a head $d$ on one end and a reduced head $d'$ at the opposite end. In order to prevent the pin withdrawing I provide a washer $d^2$ held to the reduced head by a spring ring $d^3$.

Heretofore the flat links were in direct contact with the pivot pin so that each had its individual bearing. By the construction herein shown I provide a single bearing for each series of links and lengthen the bearing by the introduction of washers between the sections, and I attach the pivot pin to one set of links so that it will turn with the said links, and I attach a bushing E, forming a bearing, to the other set of links so that it will turn with said links, the bushing taking the wear on the pin relieving the links from wear.

I have illustrated one construction in which the pin has a rib $i$ which rests in a recess $b$ in the link B, this link is cut away at $b'$ to allow the segmental bearing E to play. The segmental bearing E snugly fits a recess $a$ in the link A and the link is cut away at $a'$ to allow the rib $i$ on the pivot pin D to have sufficient play in order that the chain may accommodate itself to a sprocket wheel or a curved guide.

All the links A are recessed at $a$ for the reception of the single bearing or bushing E in the present instance, so that an extended bearing is provided for the links. On the other hand, the pivot pin D is connected to both links B and there is consequently an extended bearing for these links, thus I am enabled not only to reduce the wear but to give a maximum amount of bearing to the links at the pivot, making a very substantial connection.

It will be understood that the pivot pin may be fastened in any suitable manner without departing from my invention and any number of link elements may be used.

Modifications of the arrangement and design of the links will readily suggest themselves, for instance, a forked link B' may be used as shown in Fig. 7, which is coupled to a single member A', the pivot D' and bushing E' having the full bearing of the width of the chain, or the links may be separated to receive a roller or flight.

In Fig. 8, I have shown two links $A^2$ and $B^2$ coupled together by a pivot pin $D^2$ attached to the link $B^2$ and extending into an opening in the link $A^2$, while a segmental bushing or bearing $E^2$, which may be made detachable, is mounted in an opening in the link $A^2$ and so held as to turn with said link and extends laterally into an opening in the link $B^2$ which is of such a size as to allow the bearing to turn therein.

In Fig. 9, I have shown a pivot pin $D^4$ made integral with the link $B^4$ and a bearing $E^4$ extending laterally from the link $A^4$ and into an opening in the link $B^4$. Thus the pivot pin and bushings or bearings may be made integral with their links or made separately and attached thereto without departing from my invention.

I claim as my invention:—

1. The combination in a chain, of two sets of links, a pivot pin having a rib engaging one set of links, and a segment of a bushing mounted on the pin and having its edges in engagement with shoulders on the other set of links; said bushing and pins extending the full width of the chain, substantially as described.

2. The combination in a chain, of two sets of links, a pivot pin having a rib engaging one set of links, a bushing fitting partially around said pin having its edges engaged by shoulders of the other set of links so as to be immovably held thereto, said bushing and pin extending the full width of the chain, with a washer or washers mounted between a link element or elements so as to increase the width of the chain, substantially as described.

3. The combination of a chain link having a pivot-pin-opening and a segment of a bushing forming a pivot-pin-bearing detachably fixed within said opening and extending laterally from said link, substantially as described.

4. The combination in a chain, of two sets of links, the links of one set each having an opening, of which the greater portion is circular in outline and the remainder has a toothed shaped recess, a pivot pin having a longitudinal rib entering the toothed shaped recess of said first set of links, the second set of links each also having an opening, of which a portion is formed to permit of the free movement of the pivot pin and its rib, with a segment of a bushing fixed in the remaining portion of the opening of said second set of links and fitting around the pivot pin, substantially as described.

In testimony whereof, I have signed my name to this specification, in the presence of two subscribing witnesses.

JAMES M. DODGE.

Witnesses:
 WILL. A. BARR,
 JOS. H. KLEIN.